United States Patent Office 3,499,004
Patented Mar. 3, 1970

3,499,004
THIOPHENE-2-ALDEHYDE-THIO-SEMICARBAZONE
Erhardt Winkelmann and Heinrich Rolly, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed May 8, 1967, Ser. No. 636,663
Claims priority, application Germany, May 25, 1966, F 49,285
Int. Cl. C07d 63/12; A61k 27/00
U.S. Cl. 260—329          4 Claims

ABSTRACT OF THE DISCLOSURE

Thio-semicarbazones active against smallpox which are obtained by reacting a thiophene-aldehyde with thiosemicarbazide or a thiocyanate.

---

The present invention provides thio-semicarbazones and a process for their maufacture.

It is known that thio-semicarbonzones of aromatic and heterocyclic aldehydes are effective in vivo against the vaccinia virus (smallpox) (cf. Hamre et al., Proc. Soc. Exptl. Biol. Med. 73, 275 (1950) and R. L. Thompson et al., J. Immunol. 70, 229 (1953)).

One of the compounds hitherto known as most effective in vivo is N-methyl-istin thio-semicarbazone (cf. D. J. Bauer, Brit. J. Exptl. Pathol. 36, 105 (1955), Brit. J. Pharmacol., 15, 101 (1960)).

It has now been found that thio-semicarbazones which are highly effective against the vaccinia virus and which correspond to the formula

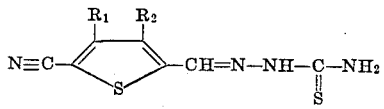

in which $R_1$ and $R_2$ represent hydrogen atoms or alkyl- or alkoxy groups containing one or two carbon atoms, can be obtained by reacting aldehydes of the formula

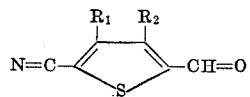

in which $R_1$ and $R_2$ have the meaning given above, or their functional derivatives with thio-semicarbazide or with thiocyanates.

As starting substances there may be used, for example, 5-cyanothiophene-2-aldehyde, 3- or 4-methyl-5-cyanothiophene-2-aldehyde and 3- or 4-methoxy-5-cyanothiophene-2-aldehyde or their functional derivatives.

5-cyanothiophene-2-aldehydes which may be substituted can be obtained by known methods from 5-halothiophene-2-aldehydes under the action of copper-(I)-cyanide in a polar solvent (cf. J. Org. Chem. 26, 2522, 2525 (1961)).

The process of the invention may, for example, be carried out in such a manner as to react molar amounts of the components (1 mol of aldehyde with 1 mol thio-semicarbazide) with each other. Generally, it is, however, advisable to use a solvent or a distributing agent in addition. It is advantageous to operate in 5 to 20 times the amount of an organic solvent, in particular alcohols of low molecular weight, for example methanol, ethanol, propanol, isopropanol as well as alkoxy-ethanols such as methoxy- and ethoxy-ethanol. It is also possible to react the components in water or in mixtures of the alcohols mentioned with water in any ratio.

The reaction period covers, in most cases, only a few minutes, depending on the conditions and the temperatures.

The condensation can be carried out without a catalyst, the presence of catalytical amounts of an acid is, however, of advantage for a quick reaction procedure. As acids there may be used, for example, lower fatty acids such as acetic acid.

Generally, the desired products of the invention crystallize out in a pure form and, if desired, they can be recrystallized from appropriate solvents.

Instead of aldehydes as starting substances, there can also be used the functional aldehyde derivatives, among which may be mentioned acetals, diacyl compounds, aldehyde-disulfite compounds, oximes or aniles which can be reacted with thio-semicarbazide under the reaction conditions mentioned above. It is also possible to start from the corresponding hydrazones or azines which are reacted with thiocyanates. As thiocyanates are preferred alkali metal thiocyanates such as potassium or sodium thiocyanate or ammonium thiocyanate.

When the reaction is carried out with thiocyanates, it is advantageous to operate in the presence of molar amounts of acids, preferably acetic acid.

The reactions of 5-cyanothiophene-2-aldehydes or their functional derivatives described above are carried out according to usual methods as, for example, described in Houben-Weyl, Methoden der organischen Chemie, 4th edition, volume 9, pages 913–915.

The new products of the invention can be employed as pharmaceutics. They are, in particular, suitable for a preventive or active treatment of variola (smallpox). When administered to rabbits in a test, the products of the invention prove distinctly superior to the known N-methyl-isatin thio-semicarbazone as well as to compounds similar in structure, as regards the effect obtained (no formation of pustules), a smaller does and a lower toxicity (see Table 1).

In the test on rabbits, the following compounds have been compared with each other:

I. 5 - cyanothiophene-2-aldehyde thio-semicarbazone (product of the present invention)
II. Thiophene-2-aldehyde thio-semicarbazone (compound similar in structure (J. Immunol. 70, 229, (1953))
III. 5-bromothiophene-2-aldehyde thio-semicarbazone (compound similar in structure (J. Immunol. 70, 222 (1953))
IV. 5-nitrothiophene - 2-aldehyde thio - semicarbazone (compound similar in structure (J. Immunol. 70, 222 (1953))

V. N-methyl-isatin thio-semicarbazone (known compound proved to be effective) (Belgian Patent No. 589,084 (1960)).

TABLE I [1]

| Preparation | Period of administering in days | Dose administered per os in milligram per kilogram of body weight | Medical evidence infective dose (dilution) | | | | | | Observations |
|---|---|---|---|---|---|---|---|---|---|
| | | | 3 days after infection | | | 8 days after infection | | | |
| | | | 1:1,000 | 1:10,000 | 1:100,000 | 1:1,000 | 1:10,000 | 1:100,000 | |
| I | 5 | 100 | — | — | — | — | — | — | |
| | 5 or 3 | 50 | — | — | — | — | — | — | |
| | 5 | 30 | — | — | — | — | — | — | |
| II | 5 | 100 | ++ | ++ | ++ | ++ | ++ | ++ | N H |
| III | 5 | 60 | ++ | ++ | ++ | ++ | ++ | ++ | N H |
| IV | 5 | 100 | ++ | ++ | + | ++ | ++ | ++ | N H G |
| V | 5 | 300 | ++ | ++ | + | ++ | ++ | ++ | N H |
| | 5 | 100 | + | ± | ± | ++ | ++ | ++ | G |
| | 5 | 50 | + | ± | ± | ++ | ++ | ++ | N H |
| Control animals | 1 | 1 | ++ | ++ | ++ | ++ | ++ | ++ | N H G |

[1] Symbols and abbreviations are given on the following page.

In a manner analogous to the method of Groth (A. Herrlich, Handbuch der Schutzimpfungen, Springer Verlag, Berlin/Heidelberg, 1965, p. 136), rabbits have been unhaired on their backs, while care was taken that the skin was not injured. From the vaccinia virus, dilutions of 1:1,000, 1:10,000 and 1:100,000 have been prepared and 0.1 ml. of each virus suspension has been injected intracutaneously so as to raise a blister. 48 hours after the infection, the first reactions can be discovered and classified according to the following scheme:

— means that the tissue is not at all affected,
± means that slightly red spots occur,
+ means that the formation of red spots is combined with infiltration
++ means a formation of pustules which change into necroses (N), cause haemorrhagiae (H) or lead to a generalisation (G), i.e. the pustules spread over the whole body and finally may cause death.

Suspended in Tylose of 0.3% strength the preparations have been administered per os once on five subsequent days, beginning with the day of the injection.

In addition, the products of the invention show a very good tuberculostatic activity in vivo.

The products of the invention may be administered orally, also in admixture with pharmaceutically usual carriers, preferably in the form of tablets or dragées into which the products of the invention may be processed as active substances together with the usual adjuvants and carriers, such as lactose, starch, tragacanth and magnesium stearate. The quotidian dosage unit form in human medicine is in the range of from 0.5 to 5 grams.

The following examples serve to illustrate the invention.

EXAMPLE 1

5-cyanothiophene-2-aldehyde thio-semicarbazone 9.1 grams (0.1 mol) of thio-semicarbazide were dissolved by heating in 100 ml. of water and 1.5 ml. of glacial acetic acid and the solution was added to a solution of 13.7 grams (0.1 mol) of 5-cyanothiophene-2-aldehyde in 100 ml. of methanol. The reaction mixture was refluxed for 15 minutes. In most cases, the final product already crystallized out when still hot, it was filtered with suction when cold, washed with water, cold ethanol and ether and dried on a steam bath.

There were obtained 19.1 grams=91% of the theoretical yield of 5-cyanothiophene-2-aldehyde thio-semicarbazone as a yellow crystalline powder which melted at 234° C. under decomposition.

$C_7H_6N_4S_2$ (molecular weight: 210). Calculated: N, 26.7%; S, 30.5%. Found: N, 26.8%; S, 30.5%.

5-cyanothiophene-2-aldehyde used as the starting substance was prepared by reacting molar amounts of 5-bromothiophene-2-aldehyde with copper-(I)-cyanide in dimethylformamide by refluxing the whole for 2 hours, distilling off the solvent under reduced pressure, treating the residue with water and shaking out the compound with ethyl acetate. There were obtained 75% of the theoretical yield of 5-cyanothiophene-2-aldehyde as a yellowish crystalline mass melting at 92° C. A purification by distillation often was of advantage (boiling point, under a pressure of 1.2 mm. of mercury: 130–135° C., melting point 94° C.).

EXAMPLE 2

3-methyl-5-cyanothiophene-2-aldehyde thio-semicarbazone 9.1 grams (0.1 mol) of thio-semicarbazide were dissolved by heating in 100 ml. of water and the solution was combined with a solution of 15.1 grams (0.1 mol) of 3-methyl-5-cyanothiophene-2-aldehyde in 100 ml. of ethanol and 0.5 ml. of glacial acetic acid was added thereto. The final product crystallized out at once, was filtered off with suction, washed with aqueous alcohol of 50% strength and ether and dried on a steam bath.

There were obtained 19.7 grams=88% of the theoretical yield of 3-methyl-5-cyanothiophene-2-aldehyde thio-semicarbazone as a yellow crystalline powder which melted at 228° C. under decomposition.

$C_8H_8N_4S_2$ (molecular weight: 224). Calculated: N, 25.0%; S, 28.6%. Found: N, 25.1%; S, 28.7%.

3 - methyl - 5 - cyanothiophene-2-aldehyde used as the starting substance was prepared by reacting molar amounts of 3-methyl-5-bromothiophene-2-aldehyde (boiling point under a pressure of 2 mm. of mercury: 75–80° C.) with copper-(I)-cyanide in dimethyl-formamide by refluxing the whole for 2 hours, distilling off the solvent under reduced pressure, treating the residue with water and shaking out the compound with ethyl acetate. After purification by fractionated distillation in vacuo (boiling point, under a pressure of 1.5 mm. of mercury: 98–102° C.), there were obtained 52% of the theoretical yield of 3 - methyl - 5-cyanothiophene-2-aldehyde as a yellowish crystalline mass melting at 86–88° C.

EXAMPLE 3

4-methyl-5-cyanothiophene-2-aldehyde thio-semicarbazone

In the manner described in Example 2, by the reaction of 9.1 grams of thio-semicarbazide with 15.1 grams of 4-methyl - 5-cyanothiophene-2-aldehyde, 4-methyl-5-cyano-thiophene-2-aldehyde thiosemicarbazone was obtained in a yield of 90% of the theoretical yield, as a light-yellow crystalline powder melting at 207° C. (decomposition).

$C_8H_8N_4S_2$ (molecular weight 224). Calculated: N, 25.0%; S, 28.6%. Found: N, 24.8%; S, 28.4%.

4 - methyl - 5 - cyanothiophene-2-aldehyde used as the starting substance was prepared from 4-methyl-5-bromothiophene-2-aldehyde (boiling point under a pressure of 2 mm. of mercury: 84–88° C.) in the manner analogous to Examples 1 and 2. There was obtained 4-methyl-5- cyanothiophene-2-aldehyde in a yield of 55% of the theoretical yield as a light-yellow oil which boils under a pressure of 1.5 mm. of mercury at 100–103° C. and crystallizes out.

We claim:
1. A thio-semicarbazone of the formula

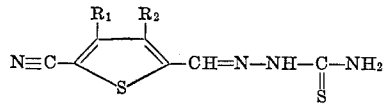

in which $R_1$ and $R_2$ are independently selected from the group consisting of hydrogen and alkyl and alkoxy groups containing one or two carbon atoms.

2. 5-cyanothiophene-2-aldehyde-thiosemicarbazone.
3. 3 - methyl-5-cyanothiophene-2-aldehyde-thiosemicarbazone.
4. 4-methyl-5-cyanothiophene - 2 - aldehyde-thiosemicarbazone.

References Cited
UNITED STATES PATENTS
2,746,972    5/1966    Clemence et al. _____ 260—329

HENRY R. JILES, Primary Examiner
C. M. SHURKO, Assistant Examiner

U.S. Cl. X.R.
260—332.3; 424—275